UNITED STATES PATENT OFFICE.

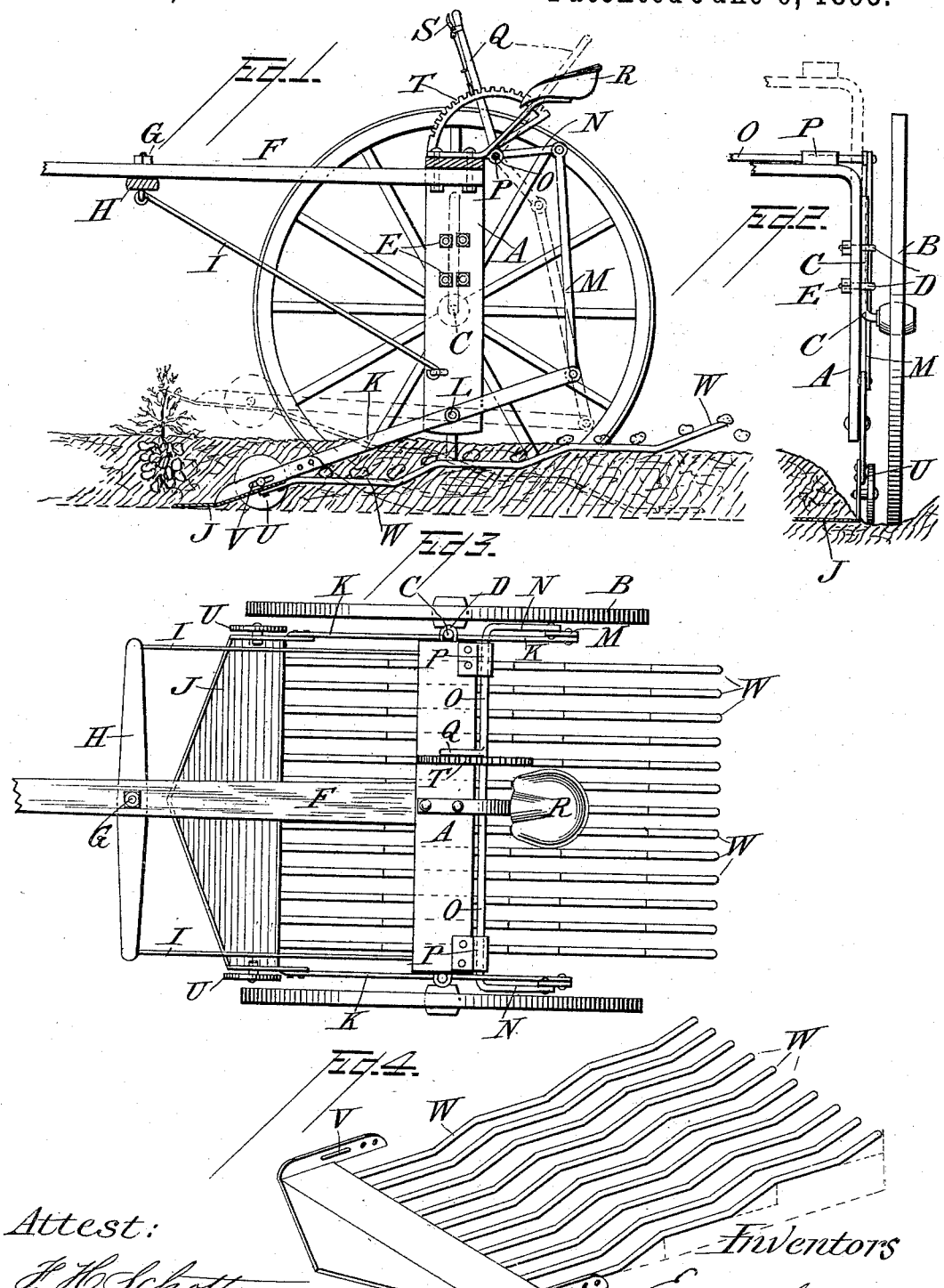

EDWARD MERCER AND WILLIAM MERCER, OF GREELEY, COLORADO.

POTATO-DIGGER.

SPECIFICATION forming part of Letters Patent No. 498,885, dated June 6, 1893.

Application filed May 12, 1892. Serial No. 432,754. (No model.)

*To all whom it may concern:*

Be it known that we, EDWARD MERCER and WILLIAM MERCER, citizens of the United States, residing at Greeley, in the county of Weld and State of Colorado, have invented certain new and useful Improvements in Potato-Diggers; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to potato-diggers, and has for its object to provide a construction which will be simple, strong and efficient and in which the potatoes will be lifted and the soil separated from them and distributed to the rear of the digger so as to leave the ground smooth and level while the potatoes will be deposited on top of the ground back of the digger.

It has further for its object to provide for the easy and ready adjustment of the shovel or plow so as to plow shallower or deeper and so as to have its point elevated above the ground when the end of the row is reached and the digger is to be turned round.

It has further for its object to provide small wheels or rollers at the forward end of the digger on opposite sides of the shovel so as to prevent the shovel from entering the soil at too acute an angle and also to afford a rolling support for the forward part of the shovel frame.

It has further for its object to provide for the easy and ready vertical adjustment of the arch frame which carries the shovel and screen so that the latter may be raised or lowered to the extent desired to accommodate different conditions of the ground surface over which the digger may be drawn.

It has further for its object to generally simplify and increase the efficiency of potato diggers.

To the accomplishment of the foregoing and such other objects as may hereinafter appear, the invention consists in the construction and the combination of parts hereinafter particularly described and then specified by the claims, reference being had to the accompanying drawings forming part hereof and in which—

Figure 1 is a side elevation of a vertical section through the digger; Fig. 2 a rear elevation of the digger with parts broken away; Fig. 3 a plan view of the digger, and Fig. 4 a perspective of the shovel, its frame and the screen.

In the drawings the letter A designates an arch frame to opposite sides of which the main wheels B are secured. The inner ends of the axle C of these wheels are bent upwardly so as to form upright arms which are secured to the sides of the arch frame by clip bolts D passed through the frame and around said upright bars so that when nuts E are screwed onto the inner end of said clip bolts the arms will be drawn tightly against the arch frame and clamped so as to hold the same securely in place. This construction allows the arch frame and the parts which it carries to be raised to the height desired as indicated by dotted lines in Fig. 2 by simply loosening the bolt and lifting the frame and then tightening up the bolts so as to clamp the upright bars and the frame securely together in their adjusted positions.

To the under part of the crown of the arch frame is bolted the rear end of the tongue F, and to the tongue is swiveled or pivoted by bolt G the double tree H. Brace rods I extend from the under side of the double-tree backwardly and downwardly and are connected at their lower ends to the sides of the arch frame, the connection to the frame and to the double tree being by eyes as illustrated or otherwise so as to make a loose connection at the points of attachment in order to allow freedom of movement in the turning or swinging of the double tree. The brace rods serve to stiffen or strengthen the parts and cause the draft to be from the lower part of the arch frame as well as from the point of attachment of the tongue to said frame.

The shovel designated by the letter J is of the flat order and is secured to the forward ends of the bars K which together with the shovel constitute a frame which is pivoted or fulcrumed between its ends to the lower portion of the arch frame by pivot bolts L. By thus pivoting the frame to the arch considerable leverage is obtained so that by application of power to the rear ends of the frame or side bars K the shovel can be raised or lowered to give the pitch desired. The movement of the frame is effected by means of rods M connected at their lower ends to the rear ends of the side bars K and at their upper ends to cranks N formed on the ends of a cross rod O journaled so as to turn in suitable bearings P secured to the top of the arch frame. This crank rod O is manipulated by means of a lever Q secured to the crank rod at a point adjacent to the seat R of the machine so as to be within easy reach of the operator and is provided with a spring finger S whose lower end will engage with a toothed quadrant T so as to hold the crank rod to the adjustment to which it may be moved and through it secure the shovel at the inclination or pitch to which it may be adjusted. This arrangement of mechanism renders the shovel and its accompanying parts capable of adjustment at the expenditure of the minimum of power and by means not liable to become easily deranged.

To the side bars K of the shovel frame, at a point adjacent to the shovel, there are secured small wheels or rollers U whose journals pass through elongated slots V in the side bars so that they can be adjusted forward or backward as conditions may require. These rollers serve to support the shovel and to prevent the same from being deflected at too acute an angle.

From the rear of the shovel, between the side bars K, extend any desired number of fingers W which constitute a screen to separate the potatoes from the soil, as the potatoes and soil move backward from the shovel over the screen. It is preferred to give to, the fingers the shape illustrated, but these fingers may be removed and replaced by others of a different shape to suit the conditions of the ground and the nature of the soil on which the machine is to operate.

Under the construction of shovel and screen illustrated, the screen runs under the soil and lifts the potatoes gradually by steps until the tail end of the screen is reached at which point the potatoes pass from the screen there standing above the soil and are dropped on top of the soil. By such construction the soil is not raised and thrown to one side as under other constructions but is evenly and smoothly distributed with the potatoes lying on top thereof freed from the soil. It will be observed too that the fingers or screen are in step form, that is they have horizontal portions and inclined risers between them so that the potatoes are supported upon the horizontal portion until pushed up the incline and are thus prevented from rolling backward and are consequently gradually lifted from front to rear being under the soil until the tail end of the screen is reached, as indicated in Fig. 1 of the drawings.

There has been illustrated and described what is considered to be the best construction and arrangement of parts to get the best results, but variations in details of the several parts can be made without departing from the essential features of construction of the machine.

Having described the invention and set forth its merits, what is claimed is—

1. In a potato digger, the combination with the arch frame, of the side bars pivoted between their ends to the lower part of said frame and carrying at their forward ends the shovel, rods connected to the ends of said side bars at the portion thereof extending to the rear of the arch frame, and a lever having connection with the upper portion of said rod for raising and lowering the side bars carrying the shovel, substantially as and for the purposes described.

2. In a potato digger, the combination with the arch frame, of the side bars pivoted between their ends to the lower part of said frame and carrying the shovel, the lever operated crank rod journaled in suitable bearings on the arch frame, and the rods connected at their upper ends to the cranks of said crank rod and at their lower ends to the rearwardly extending portions of the shovel carrying bars back of the arch frame, substantially as and for the purposes described.

3. In a potato digger, the combination with the main supporting frame, of the shovel carrying frame pivoted to the lower part of said main frame so as to extend front and rear of the same, and the small wheels or rollers adjustably journaled to the sides of said shovel carrying frame adjacent to the shovel, substantially as and for the purposes described.

4. In a potato digger, the combination with the arch frame, of the shovel carrying frame journaled to the lower part of said arch frame, so as to extend front and rear of the upright sides of said frame, and the screen extending rearwardly from the shovel and between the arch frame, and lying below said shovel frame by which it is carried, said screen gradually rising from front to rear in a fixed relation to said shovel carrying frame whereby the forward portion of the screen will pass under the soil and the rear portion stand at the highest point to gradually elevate and discharge the potatoes and separate them by degrees from the soil, substantially as and for the purposes described.

In testimony whereof we affix our signatures in presence of two witnesses.

EDWARD MERCER.
WILLIAM MERCER.

Witnesses:
JOHN G. HALL,
ROBERT T. COLLINS.